(12) United States Patent
Matsushita

(10) Patent No.: US 10,039,063 B2
(45) Date of Patent: Jul. 31, 2018

(54) PARKING AND LOCATION DETERMINATION ON-VEHICLE DEVICE

(71) Applicant: DENSO CORPORATION, Kariya, Aichi-pref. (JP)

(72) Inventor: Suguru Matsushita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/550,919

(22) PCT Filed: Feb. 18, 2016

(86) PCT No.: PCT/JP2016/000844
§ 371 (c)(1),
(2) Date: Aug. 14, 2017

(87) PCT Pub. No.: WO2016/143269
PCT Pub. Date: Sep. 15, 2016

(65) Prior Publication Data
US 2018/0027504 A1    Jan. 25, 2018

(30) Foreign Application Priority Data

Mar. 6, 2015  (JP) .................................. 2015-045149

(51) Int. Cl.
*H04W 24/00* (2009.01)
*H04W 52/28* (2009.01)
(Continued)

(52) U.S. Cl.
CPC ........... *H04W 52/28* (2013.01); *H04W 4/046* (2013.01); *H04W 24/02* (2013.01); *H04W 84/12* (2013.01)

(58) Field of Classification Search
CPC ..... H04W 52/28; H04W 4/046; H04W 24/02; H04W 84/12
See application file for complete search history.

(56) References Cited

U.S. PATENT DOCUMENTS

2007/0109093 A1    5/2007   Matsubara et al.
2007/0162191 A1    7/2007   Matsubara et al.
(Continued)

FOREIGN PATENT DOCUMENTS

JP    2005268933 A    9/2005
JP    2007146501 A    6/2007
(Continued)

*Primary Examiner* — Keith Fang
(74) *Attorney, Agent, or Firm* — Harness, Dickey & Pierce, P.L.C.

(57) ABSTRACT

An on-vehicle device, which is to be mounted on a vehicle, includes a wireless communication unit which is connected to a mobile terminal located within a communication range to perform wireless communication with the mobile terminal, and provides a service using the wireless communication in the wireless communication unit. The on-vehicle device further includes a parking determination unit which determines whether or not the vehicle is parked and a communication range changing unit which narrows, when the parking determination unit determines that the vehicle is parked, the communication range of the wireless communication unit such that the communication range is narrower than that before the parking determination unit determines that the vehicle is parked.

13 Claims, 7 Drawing Sheets

(51) Int. Cl.
    *H04W 24/02*     (2009.01)
    *H04W 4/04*     (2009.01)
    *H04W 84/12*     (2009.01)

(56) References Cited

U.S. PATENT DOCUMENTS

| | | | |
|---|---|---|---|
| 2013/0300354 A1 | 11/2013 | Ichikawa et al. | |
| 2014/0306814 A1* | 10/2014 | Ricci | H04W 4/21 340/425.5 |
| 2015/0141043 A1* | 5/2015 | Abramson | G01C 21/34 455/456.1 |
| 2016/0150356 A1 | 5/2016 | Matsushita et al. | |

FOREIGN PATENT DOCUMENTS

| | | | |
|---|---|---|---|
| JP | 2012169792 A | 9/2012 |
| JP | 2013032105 A | 2/2013 |
| JP | 2013128244 A | 6/2013 |
| JP | 2013240132 A | 11/2013 |
| JP | 2014130566 A | 7/2014 |
| JP | 2015006852 A | 1/2015 |
| JP | 2015023346 A | 2/2015 |

\* cited by examiner

PARKING AND LOCATION DETERMINATION ON-VEHICLE DEVICE

CROSS REFERENCE TO RELATED APPLICATIONS

This application is a U.S. National Phase Application under 35 U.S.C. 371 of International Application No. PCT/JP2016/000844 filed on Feb. 18, 2016 and published in Japanese as WO 2016/143269 A1 on Sep. 15, 2016. This application is based on and claims the benefit of priority from Japanese Patent Application No. 2015-045149 filed on Mar. 6, 2015. The entire disclosures of all of the above applications are incorporated herein by reference.

TECHNICAL FIELD

The present disclosure relates to an on-vehicle device which performs wireless communication with a mobile terminal.

BACKGROUND ART

As described in Patent Literature 1, a technique has been known which allows a user to receive various services such as a hands-free phone call using wireless communication between a mobile terminal carried by the user and an on-vehicle device mounted on a vehicle. In general, an on-vehicle device which performs wireless communication with a mobile terminal is connected to the mobile terminal to communicate therewith and provide a service when the mobile terminal is within a communication range. When the mobile terminal is out of the communication range, the on-vehicle device is disconnected from the communication connection to end the service.

PRIOR ART LITERATURE

Patent Literature

Patent Literature 1: JP 2014-130566 A

SUMMARY OF INVENTION

Services using wireless communication between a mobile terminal and an on-vehicle device are not limited to services available only in a vehicle interior, such as the hands-free phone call disclosed in Patent Literature 1. For example, demands for services such as data communication which allows data on a vehicle to be received outside the vehicle even after the ignition power supply of the vehicle is turned OFF and a remote operation which allows the equipment of the vehicle to be operated from outside the vehicle can also be expected in future. When it is necessary for a mobile terminal outside a vehicle and an on-vehicle device to perform wireless communication as in the data communication service and the remote operation service, the communication range of the on-vehicle device needs to be set extensively to the outside of the vehicle.

However, when the communication range of an on-vehicle device capable of communication connection even after the ignition power supply of a vehicle is turned OFF is set extensively to the outside of the vehicle, a communication connection may be established between the mobile terminal and the on-vehicle device in a situation where the communication connection is not intended by a user. For example, such a case can be considered where an on-vehicle device on a vehicle parked in the garage of the user's home is connected to a mobile terminal placed at the user's home to communicate therewith, even though the communication connection is not intended by the user. When a communication connection is established between an on-vehicle device and a mobile terminal even in a situation where the communication connection is not intended by the user, the power of the on-vehicle device and the mobile terminal is uselessly wasted.

It is an object of the present disclosure to provide an on-vehicle device, which provides a service using wireless communication with a mobile terminal, and is capable of reducing power waste in the on-vehicle device and in the mobile terminal.

According to an embodiment of the present disclosure, an on-vehicle device, which is to be mounted on a vehicle, includes a wireless communication unit which is connected to a mobile terminal located within a communication range to perform wireless communication with the mobile terminal. The on-vehicle device provides a service using the wireless communication in the wireless communication unit. The on-vehicle device further includes a parking determination unit and a communication range changing unit. The parking determination unit determines whether or not the vehicle is parked. The communication range changing unit narrows, when the parking determination unit determines that the vehicle is parked, the communication range of the wireless communication unit such that the communication range is narrower than that before the parking determination unit determines that the vehicle is parked.

According to the embodiment, when the parking determination unit determines that the vehicle is parked, the communication range changing unit narrows the communication range of the wireless communication unit such that the communication range is narrower than that before the determination of the parking of the vehicle by the parking determination unit. This allows the communication range to be narrowed when the vehicle is parked. Since the communication range can be narrowed when the vehicle is parked, the situation where the on-vehicle device on the vehicle parked in the garage of the user's home is connected to the mobile terminal placed at the user's home to communicate therewith even when the communication connection is not intended by the user is less likely to occur. This can reduce useless communication connection between the on-vehicle device and the mobile terminal and reduce power waste in the on-vehicle device and the mobile terminal. As a result, in an on-vehicle device which provides a service using wireless communication with a mobile terminal, it is possible to reduce power waste in the on-vehicle device and the mobile terminal.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS (First Embodiment)
<Schematic Configuration of Short-Range Wireless Communication System 100>

Figure 1:
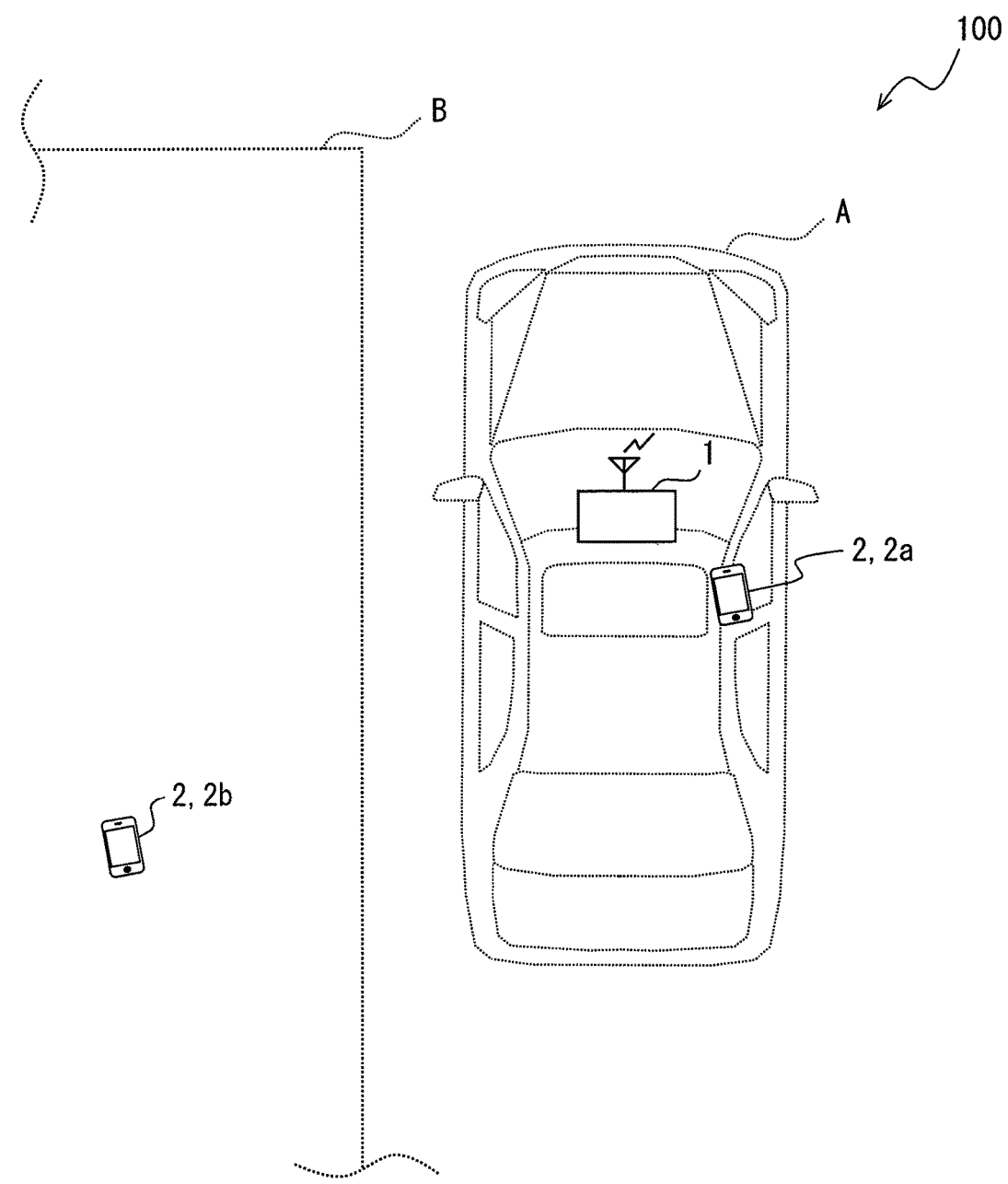
FIG. 1 is a view showing an example of a schematic configuration of a short-range wireless communication system.

An embodiment of the present disclosure will be described with reference to the drawings. FIG. 1 is a view showing an example of a schematic configuration of a short-range wireless communication system 100 to which the present disclosure is applied. As shown in FIG. 1, the short-range wireless communication system 100 includes a short-range wireless communication device 1 mounted on a vehicle A, a mobile terminal 2a, and a mobile terminal 2b.

The mobile terminals 2a and 2b are mobile terminals such as a multifunctional mobile phone that can be carried or brought along by a user. The mobile terminal 2a is located in the interior of the vehicle A. The mobile terminal 2b is located at a place away from the vehicle A, such as in a room in a building B. By way of example, it is assumed that the mobile terminals 2a and 2b are identical mobile terminals except that the locations thereof relative to the short-range wireless communication device 1 are different. Each of the mobile terminals 2a and 2b will be hereinafter referred to as a mobile terminal 2 when no distinction is made therebetween.

In the present embodiment, by way of example, a configuration in which the short-range wireless communication system 100 includes the plurality of mobile terminals will be described. However, the configuration may also be such that the short-range wireless communication system 100 includes only one mobile terminal.

As described above, the short-range wireless communication device 1 is mounted on the vehicle A. The short-range wireless communication device 1 is connected to the mobile terminal 2 located within the communication range of the short-range wireless communication device 1 to perform wireless communication with the mobile terminal 2 and controls the equipment mounted on the vehicle A to provide a service using the wireless communication.

Examples of the service include a hands-free phone call made using the speaker and microphone mounted on the vehicle A instead of a phone call made using the mobile terminal 2 and audio streaming which allows a car audio set to reproduce the music stored in the mobile terminal 2. Besides, there are also data communication which allows the mobile terminal 2 to acquire information from the equipment of the vehicle A and a remote operation which allows the equipment of the vehicle A to be operated from the mobile terminal 2. In addition, such a service which reports the presence of the user of the mobile terminal 2 located around the vehicle A during the running of the vehicle A or the like can also be considered. Examples of the information acquired by the mobile terminal 2 via data communication include the average fuel efficiency of the vehicle A, the running distance thereof, and the tire pressure thereof. Examples of the remote operation include an operation of activating a car air-conditioner from outside the vehicle.

The short-range wireless communication device 1 also performs a communication range changing process which changes a communication range in accordance with conditions. The details of the communication range changing process will be described later. The short-range wireless communication device 1 corresponds to an on-vehicle device.

<Schematic Configuration of Short-Range Wireless Communication Device 1>

Figure 2:
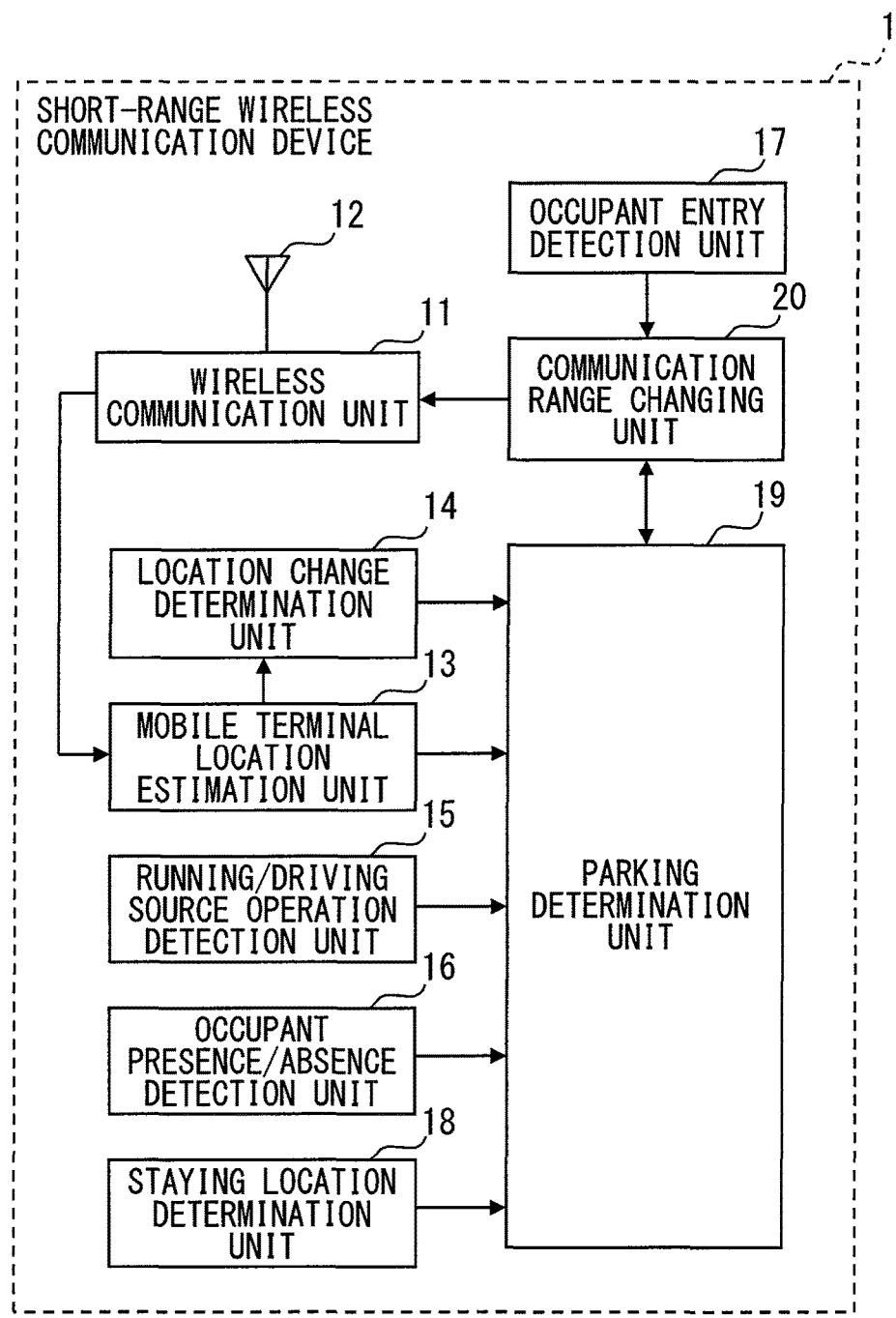
FIG. 2 is a functional block diagram showing an example of a schematic configuration of a short-range wireless communication device.

Using FIG. 2, a description will be given of a configuration related to the communication range changing process by the short-range wireless communication device 1, which is mentioned above. FIG. 2 is a functional block diagram showing an example of a schematic configuration of the short-range wireless communication device 1 which is related to the communication range changing process. As shown in FIG. 2, the short-range wireless communication device 1 includes a wireless communication unit 11, a mobile terminal location estimation unit 13, a location change determination unit 14, a running/driving source operation detection unit 15, an occupant presence/absence detection unit 16, an occupant entry detection unit 17, a staying location determination unit 18, a parking determination unit 19, and a communication range changing unit 20.

The wireless communication unit 11 has one antenna 12 and performs short-range wireless communication covering a communication range of about several tens of meters at a maximum with the mobile terminal 2. The antenna 12 is assumed to be, e.g., a transmission/reception antenna. As the short-range wireless communication, in terms of convenience, short-range wireless communication compliant with a short-range wireless communication standard which is typically used for multi-functional mobile phones, such as Bluetooth (registered trademark) or Wi-Fi (registered trademark) is used preferably. Besides, such a configuration may also be adopted in which, in an electronic key system such as a smart entry system, the mobile terminal 2 is used instead of an electronic key and, to allow the wireless communication unit 11 to be commonly used also as the wireless communication unit used in the electronic key system, short-range wireless communication using a UHF band is employed.

When only one antenna is used for transmission, the configuration may also be such that the wireless communication unit 11 has one transmission antenna and one reception antenna, instead of having the one transmission/reception antenna. When the wireless communication unit 11 is commonly used also as the wireless communication unit used in the electronic key system, the configuration may also be such that a plurality of the same antennas as the antenna used in the electronic key system are provided.

The mobile terminal location estimation unit 13 sequentially estimates the location of the mobile terminal 2 relative to the vehicle A. For example, the mobile terminal location estimation unit 13 estimates the distance from the vehicle A to the location of the mobile terminal 2 on the basis of the received signal strength (i.e., RSSI) of the signal received by the wireless communication unit 11 from the mobile terminal 2. In another example, when each of the mobile terminal 2 and the equipment mounted on the vehicle A has a positioning function which specifies the current location using a GNSS (Global Navigation Satellite System), it may be appropriate to estimate the location of the mobile terminal 2 relative to the vehicle A based on the locations of the mobile terminal 2 and the vehicle A which are specified using the GNSS. The specified location of the mobile terminal 2 may appropriately be received by the wireless communication unit 11 to be usable. The specified position of the vehicle A may appropriately be acquired from the equipment mounted on the vehicle A.

The location change determination unit 14 determines whether or not the location of the mobile terminal 2 relative to the vehicle A which is sequentially estimated by the mobile terminal location estimation unit 13 has changed over a given time period. By way of example, in a case where the distance from the location when the counting of the given time period is started to the location when the counting of the given time period is ended is less than a threshold, which is a difference comparable to an error, it may be determined appropriately that the location of the mobile terminal 2 relative to the vehicle A has not changed over the given time period. It is appropriate for the given time period to be long enough to say that the mobile terminal 2 is placed at some place. The given time period can be set arbitrarily.

The running/driving source operation detection unit 15 detects whether the running/driving source of the vehicle A is ON or OFF. For example, when the vehicle A uses an engine as the running/driving source, the running/driving source operation detection unit 15 detects whether the engine is ON or OFF. When the vehicle A uses a motor as the running/driving source, the running/driving source operation detection unit 15 detects whether the motor is ON or OFF. In the present embodiment, by way of example, the following description will be given of the case where the running/driving source operation detection unit 15 detects whether the engine is ON or OFF. Whether the engine is ON or OFF may be detected appropriately from a signal from an ignition switch.

The occupant presence/absence detection unit 16 detects the presence or absence of an occupant in the interior of the vehicle A. By way of example, the presence or absence of an occupant in the interior of the vehicle A may be detected appropriately from a signal from a seat occupancy sensor provided in the seats of the vehicle A. The occupant entry detection unit 17 detects entry of an occupant into the vehicle A. By way of example, the entry of an occupant into the vehicle A may be detected appropriately from a signal from a door courtesy switch and a signal from the seat occupancy sensor. Alternatively, the entry of an occupant into the vehicle A may also be detected from a signal from a touch switch provided in an outer door handle.

Note that such a configuration may also be adopted in which the occupant to be detected by the occupant presence/absence detection unit 16 and the occupant entry detection unit 17 is limited to an occupant carrying the mobile terminal 2. In this case, the occupant presence/absence detection unit 16 may appropriately detect the presence/absence of an occupant in the interior of the vehicle A on the basis of whether or not the location of the mobile terminal 2 is estimated within a range corresponding to the vehicle interior by the mobile terminal location estimation unit 13. The occupant entry detection unit 17 may appropriately detect the entry of an occupant into the vehicle A on the basis of whether or not the location of the mobile terminal 2 has been estimated within the range corresponding to the vehicle interior by the mobile terminal location estimation unit 13.

In the case where the wireless communication unit 11 is commonly used also as the wireless communication unit used in the electronic key system, it may also be possible to determine whether or not the mobile terminal 2 is located in the vehicle interior using an in-vehicle checking process in the electronic key system and detect the presence or absence of an occupant in the interior of the vehicle A and the entry of an occupant into the vehicle A.

The staying location determination unit 18 determines whether or not the vehicle A is located at a predetermined place. Examples of the predetermined place include the user's home and a destination. When the equipment mounted on the vehicle A has a positioning function which specifies the current location using the GNSS, whether or not the vehicle A is located at the predetermined place may be determined appropriately on the basis of whether or not the location of the vehicle A specified by the equipment matches the location of the predetermined place that has been registered in advance. Alternatively, such a configuration may also be adopted in which information on the location of a Wi-Fi access point at the predetermined place is registered in advance in the short-range wireless communication device 1, and whether or not the vehicle A is located at the predetermined place is determined on the basis of whether or not a radio wave is received from the Wi-Fi access point.

The parking determination unit 19 determines whether or not the vehicle A is parked. The parking determination unit 19 determines whether or not the vehicle A is parked on the basis of the estimation result from the mobile terminal location estimation unit 13, the respective determination results from the location change determination unit 14 and the staying location determination unit 18, and the respective detection results from the running/driving source operation detection unit 15 and the occupant presence/absence detection unit 16. The details of the process in the parking determination unit 19 will be described later.

The communication range changing unit 20 changes the communication range of the wireless communication unit 11 on the basis of the determination result from the parking determination unit 19 and the detection result from the occupant entry detection unit 17. By way of example, the communication range changing unit 20 changes the communication range of the wireless communication unit 11 by changing a transmission output from the antenna 12. In the present embodiment, it is assumed that, as the communication range, there are two types, which are a narrow communication range limited to the vicinity of the vehicle A and a wide communication range extending to a region e.g., several meters away from the vehicle A. It is also assumed that, by default, the wide communication range is set by the communication range changing unit 20.

<Communication Range Changing Process>

Figure 3:
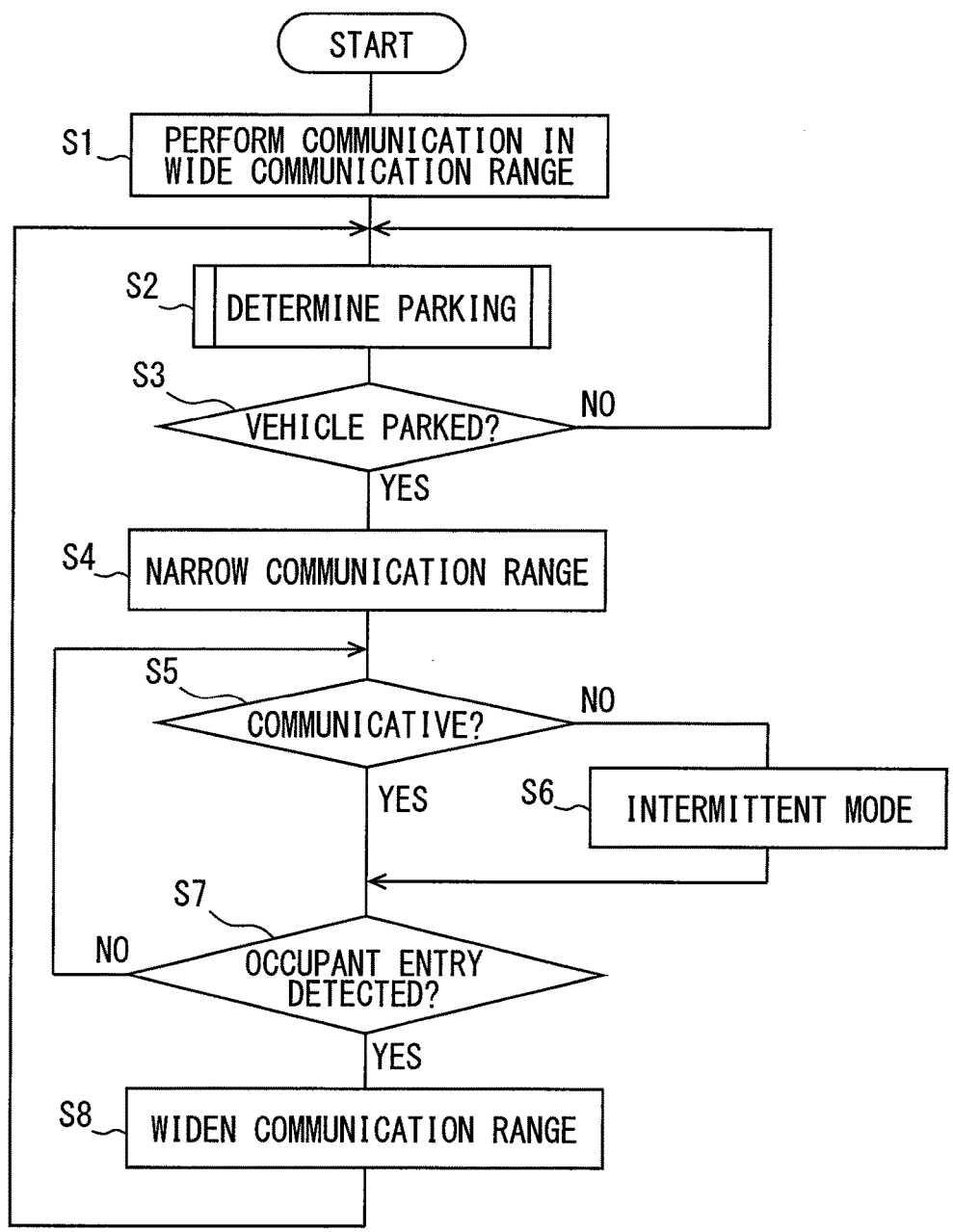
FIG. 3 is a flow chart showing an example of the flow of a communication range changing process performed by the short-range wireless communication device according to a first embodiment.

Subsequently, using the flow chart of FIG. 3, a description will be given of an example of the flow of the communication range changing process in the short-range wireless communication device 1. The flow chart of FIG. 3 may be configured appropriately to start the process when, e.g., the power supply of the short-range wireless communication device 1 is turned ON and end the process when the power supply of the short-range wireless communication device 1 is turned OFF. Note that, when there is a switch which can be operated by a user and by which the user can switch to use or not to use the short-range wireless communication device 1, the flow chart of FIG. 3 may also be configured appropriately to start the process when the switch receives a user operation indicative of the use of the short-range wireless communication device 1 and end the process when the switch receives a user operation indicative of the non-use thereof.

First, in S1, the communication range changing unit 20 sets the wide communication range as the communication range of the wireless communication unit 11. When there is the mobile terminal 2 capable of communication connection with the wireless communication unit 11, the wireless communication unit 11 performs wireless communication with the mobile terminal 2.

Figure 4:
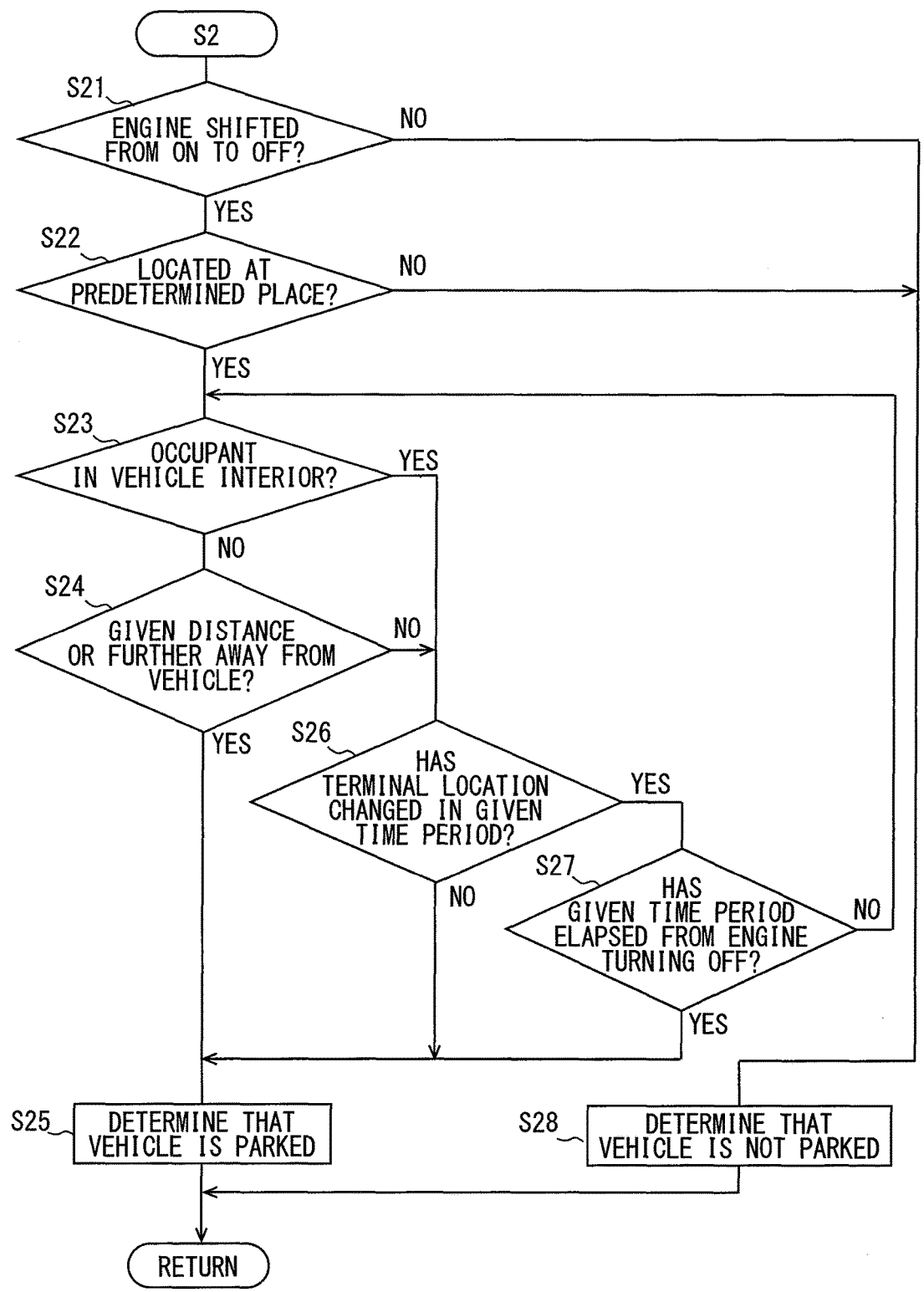
FIG. 4 is a flow chart showing an example of the flow of a parking determination in the communication range changing process.

In S2, the parking determination unit 19 makes a parking determination by determining whether or not the vehicle A is parked. Using the flow chart of FIG. 4, the outline of the parking determination will be described herein.

First, in S21, when it is detected by the running/driving source operation detection unit 15 that the engine of the vehicle A has shifted from the ON state to the OFF state (YES in S21), the process moves to S22. On the other hand, when it is not detected that the engine of the vehicle A has shifted from the ON state to the OFF state (NO in S21), the process moves to S28. It is assumed that, even when the ignition power supply is turned OFF, the short-range wireless communication device 1 receives a supply of power from, e.g., a back-up power supply to be activated.

In S22, when it is determined by the staying location determination unit 18 that the vehicle A is located at the predetermined place (YES in S22), the process moves to S23. On the other hand, when it is determined that the vehicle A is not located at the predetermined place (NO in S22), the process moves to S28.

In S23, when it is determined by the occupant presence/absence detection unit 16 that there is no occupant in the interior of the vehicle A (NO in S23), the process moves to S24. On the other hand, when it is determined that there is an occupant in the interior of the vehicle A (YES in S23), the process moves to S26.

In S24, when the location of the mobile terminal 2 (i.e., terminal location) relative to the vehicle A which is estimated by the mobile terminal location estimation unit 13 is at a given distance or further away from the vehicle A (YES in S24), the process moves to S25. On the other hand, when the location of the mobile terminal 2 relative to the vehicle A is at a distance shorter than the given distance from the vehicle A (NO in S24), the process moves to S26. It is appropriate for the given distance mentioned herein to be not less than a distance which is long enough to say that the occupant has got out of the vehicle A. The given distance mentioned herein can be set arbitrarily. In S25, the parking determination unit 19 determines that the vehicle A is parked, and the process moves to S3.

In S26, when it is determined by the location change determination unit 14 that the location of the mobile terminal 2 (i.e., terminal location) relative to the vehicle A has not changed over a given time period (NO in S26), the process moves to S25. On the other hand, when it is determined that the location of the mobile terminal 2 relative to the vehicle A has changed in the given time period (YES in S26), the process moves to S27.

In S27, when a given time period has elapsed from the detection of the turning OFF of the engine of the vehicle A by the running/driving source operation detection unit 15 (YES in S27), the process moves to S25. On the other hand, when the given time period has not elapsed from the detection of the turning OFF of the vehicle A (NO in S27), the process returns to S23 to be repeated. It is appropriate for the given time period mentioned herein to be longer than the given time period used in the location change determination unit 14. The given time period mentioned herein can be set arbitrarily. In S28, the parking determination unit 19 determines that the vehicle A is not parked, and the process moves to S3.

Referring back to FIG. 3, in S3, when it is determined that the vehicle is parked as a result of the parking determination in S2 (YES in S3), the process moves to S4. On the other hand, when it is determined that the vehicle is not parked as a result of the parking determination in S2 (NO in S3), the process moves to S2 to be repeated.

In S4, the communication range changing unit 20 changes the communication range of the wireless communication unit 11 from the wide communication range to the narrow communication range. In S4, the communication range of the wireless communication unit 11 is changed to the narrower range without halting the operation of the wireless communication unit 11. More specifically, by reducing the transmission output from the antenna 12 without eliminating the transmission from the antenna 12, the communication range of the wireless communication unit 11 is changed to the narrower range.

In S5, when the mobile terminal 2 is within the communication range of the wireless communication unit 11 and the wireless communication unit 11 and the mobile terminal 2 are connected to be communicative (YES in S5), the process moves to S7. On the other hand, when the mobile terminal 2 is not within the communication range of the wireless communication unit 11 and the wireless communication unit 11 and the mobile terminal 2 are not connected to be non-communicative (NO in S5), the process moves to S6.

In S6, the short-range wireless communication device 1 shifts to an intermittent mode in which the transmission or reception period of a radio wave in the wireless communication unit 11 is changed to a longer period to suppress power consumption, and the process moves to S7. Once the short-range wireless communication device 1 has shifted to the intermittent mode, the intermittent mode is sustained until the wireless communication unit 11 and the mobile terminal 2 become communicative in S5. When the wireless communication unit 11 and the mobile terminal 2 become communicative in S5, the intermittent mode is ended.

In S7, when the occupant entry detection unit 17 detects the entry of an occupant into the vehicle A (YES in S7), the process moves to S8. On the other hand, when the occupant entry detection unit 17 does not detect the entry of an occupant into the vehicle A (NO in S7), the process returns to S5 to be repeated. In S8, the communication range changing unit 20 changes the communication range of the wireless communication unit 11 from the narrow communication range to the wide communication range, and the process returns to S2 to be repeated.

<Summary of First Embodiment>

Figure 5:
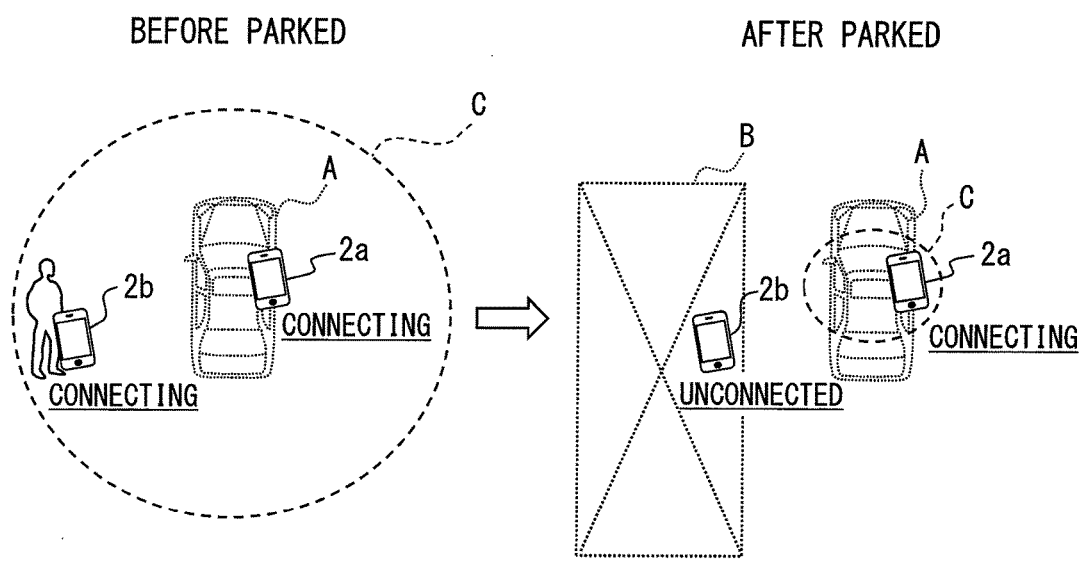
FIG. 5 is a view for illustrating effects achieved by the configuration of the first embodiment.

Using FIG. 5, a specific description will be given herein of the functions and effects achieved by the configuration of the first embodiment. In FIG. 5, C represents the communication range of the wireless communication unit 11 of the short-range wireless communication device 1 mounted on the vehicle A. FIG. 5 shows a situation before the vehicle A is parked and a situation after the vehicle A is parked. The building B of FIG. 5 is assumed to be, e.g., the user's home.

As shown in FIG. 5, before the vehicle A is parked, the communication range of the wireless communication unit 11 is the wide communication range. Accordingly, using the mobile terminal 2a in the interior of the vehicle A, a service such as a hands-free phone call or audio streaming can be used via wireless communication with the wireless communication unit 11. In addition, a service which reports the presence of the user of the mobile terminal 2b located around the vehicle A during the running of the vehicle A or the like can also be used.

By contrast, after it is determined that the vehicle A is parked (i.e., after the parking of the vehicle A), the communication range of the wireless communication unit 11 is changed to the communication range narrower than the communication range before it is determined that the vehicle A is parked. Accordingly, the situation where the short-range wireless communication device 1 of the vehicle A parked in the garage of the user's home is connected to the mobile terminal 2b placed in the building B as the user's home to communicate therewith even though the communication connection is not intended by the user is less likely to occur. As a result, it is possible to reduce useless communication connection between the short-range wireless communication device 1 and the mobile terminal 2b and reduce power waste in the short-range wireless communication device 1 and the mobile terminal 2b.

In the configuration of the first embodiment, even when the communication range of the wireless communication unit 11 is changed to the narrow communication range, wireless communication can be performed within the communication range. Accordingly, using the mobile terminal 2a in the interior of the vehicle A, a service such as a hands-free phone call or audio streaming can be used continuously via the wireless communication with the wireless communication unit 11. In addition, since the communication range has extended to the vicinity of the vehicle A, even outside the vehicle, by bringing the mobile terminal 2 closer to the vehicle A, a service such as data communication or a remote operation can also be used continuously.

Also, in the configuration of the first embodiment, when the entry of an occupant into the vehicle A is detected after the determination of the parking of the vehicle A, the communication range is changed to the wider range. This allows the use of a service which needs the wide communication range to be resumed when the occupant gets into the vehicle without involving any operation by the user.

Besides, in the configuration of the first embodiment, the parking of the vehicle is determined on the basis of not only the OFF state of the engine, but also various other conditions. This can enhance the accuracy of the determination of the parking of the vehicle. Also, in the configuration of the first embodiment, the communication range of the wireless communication unit 11 is changed by changing the transmission output from the one antenna 12. This can achieve a more significant cost reduction than achieved in a configuration using a plurality of antennas.

(First Modification)

The first embodiment has shown the configuration which changes the communication range of the wireless communication unit 11 between the wide communication range and the narrow communication range at two levels. However, the configuration is not necessarily limited thereto. For example, the communication range of the wireless communication unit 11 may be categorized into a plurality of levels more than two levels, and be changed stepwise from one of the levels to another (hereinafter referred to as a first modification).

The following will describe the first modification using the drawings. Note that, for the convenience of description, in the description of the first modification and subsequent description, members having the same functions as those of the members shown in the drawings used for the previous description shall be given the same reference numerals and a description thereof is omitted. The short-range wireless communication device 1 of the first modification is the same as the short-range wireless communication device 1 of the first embodiment except that the process related to the changing of the communication range in the communication range changing unit 20 partially differs from that of the first embodiment.

Figure 6:
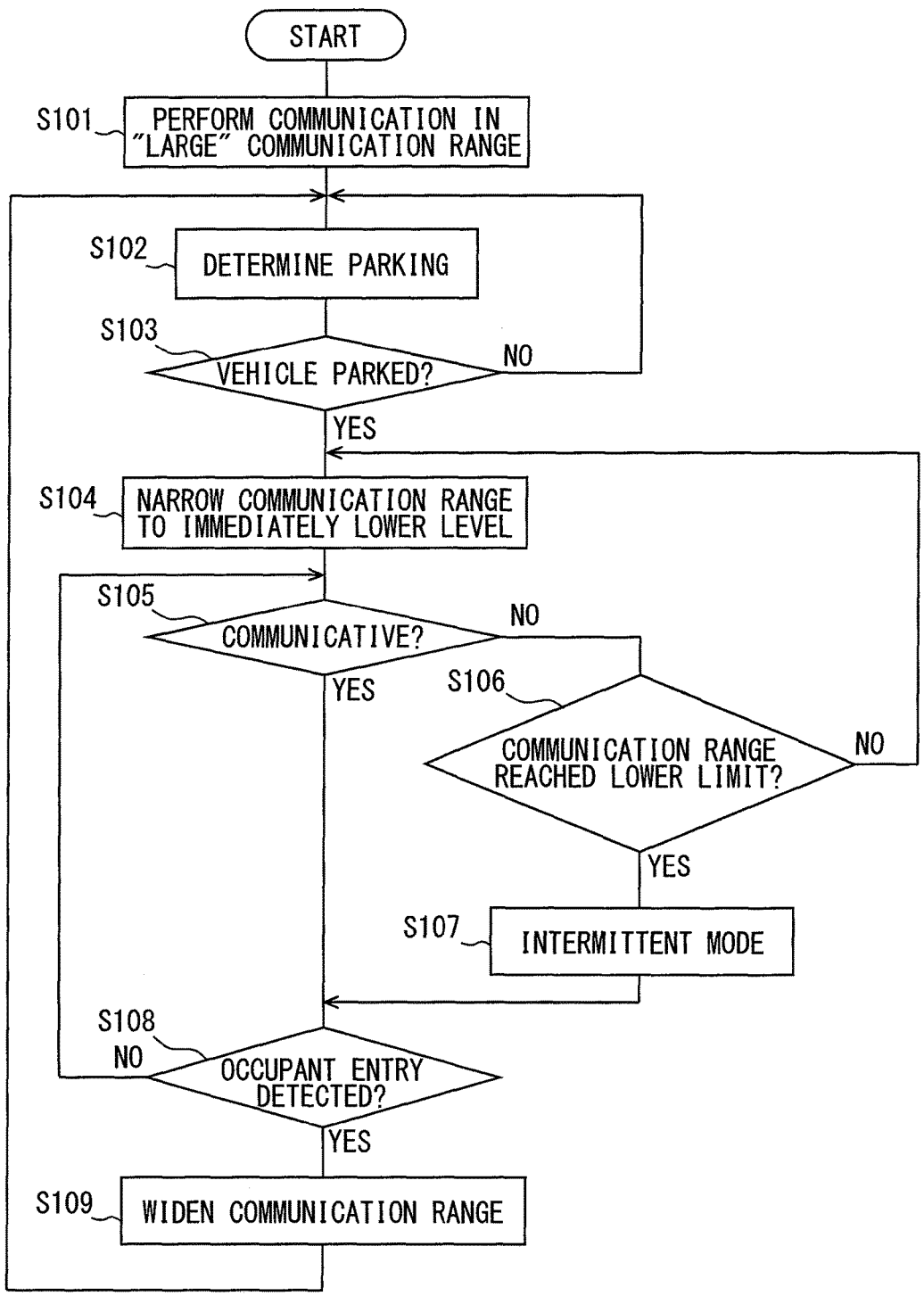
FIG. 6 is a flow chart showing an example of the flow of a communication range changing process performed by a short-range wireless communication device according to a first modification.

Using the flow chart of FIG. 6, a description will be given herein of an example of the flow of the communication range changing process in the short-range wireless communication device 1 of the first modification. Timings for starting and ending the process in the flow chart of FIG. 6 may appropriately be the same as those in the flow chart of FIG. 3. In the description given herein, the case where the communication range is changed between "Large", "Medium", and "Small" communication ranges at three levels is used as an example.

First, in S101, the communication range changing unit 20 sets the "Large" communication range as the communication range of the wireless communication unit 11. When there is the mobile terminal 2 capable of communication connection with the wireless communication unit 11, wireless communication is performed with the mobile terminal 2.

In S102, in the same manner as in S2 described above, the parking determination unit 19 makes a parking determination by determining whether or not the vehicle A is parked. In S103, when it is determined that the vehicle A is parked as a result of the parking determination in S102 (YES in S103), the process moves to S104. On the other hand, when it is determined that the vehicle A is not parked as a result of the parking determination in S102 (NO in S103), the process returns to S102 to be repeated.

In S104, the communication range changing unit 20 changes the communication range of the wireless communication unit 11 to a narrower communication range at the level immediately lower than that of the current communication range. When the current communication range is the "Large" communication range, the "Large" communication range is changed to the "Medium" communication range. When the current communication range is the "Medium" communication range, the "Medium" communication range is changed to the "Small" communication range. In S104 also, in the same manner as in S4 described above, the communication range of the wireless communication unit 11 is changed to a narrower range without halting the operation of the wireless communication unit 11.

In S105, in the same manner as in S5 described above, when the wireless communication unit 11 and the mobile terminal 2 are connected to be communicative (YES in S105), the process moves to S108. On the other hand, when the wireless communication unit 11 and the mobile terminal 2 are not connected to be non-communicative (NO in S105), the process moves to S106.

In S106, when the communication range of the wireless communication unit 11 is changed to the "Small" communication range, i.e., has reached the lower limit (YES in S106), the process moves to S107. On the other hand, when the communication range of the wireless communication unit 11 has not reached the lower limit (NO in S106), the process returns to S104 to be repeated. In S107, in the same manner as in S6 described above, the short-range wireless communication device 1 shifts to the intermittent mode, and the process moves to S108.

As a result, in the case where, e.g., the wireless communication unit 11 and the mobile terminal 2 are connected to be communicative when the communication range is changed to the "Medium" communication range, the process of narrowing the communication range is temporarily halted at the level of the "Medium" communication range. Consequently, the "Medium" communication range is maintained.

In S108, when the occupant entry detection unit 17 detects the entry of an occupant into the vehicle A (YES in S108), the process moves to S109. On the other hand, when the occupant entry detection unit 17 does not detect the entry of an occupant (NO in S108), the process returns to S105 to be repeated. In S109, in the same manner as in S8 described above, the communication range changing unit 20 changes the communication range of the wireless communication unit 11 to a wider range such as, e.g., the "Large" communication range, and the process returns to S102 to be repeated.

In the configuration of the first modification also, after the parking of the vehicle A is determined, the communication range of the wireless communication unit 11 is changed to the narrower communication range. This can reduce useless communication connection between the short-range wireless communication device 1 and the mobile terminal 2 and reduce power waste in the short-range wireless communication device 1 and the mobile terminal 2.

Also, in the configuration of the first modification, the communication range is categorized into a plurality of levels and stepwise changed to lower-level narrower ranges and, as necessary, the changing of the communication range is stopped at a middle level. This allows the user to use a service in the communication range satisfying the need of the user. The following will describe an example. For example, when there is a terminal at a location where the terminal is connected to be communicative in the "Medium" communication range and a service is used in this communication range, it is possible to stop narrowing the communication range to the "Small" communication range and allow the service to be continuously used in the "Middle" communication range. This can allow the user to use the service in the communication range satisfying the need of the user without excessively narrowing the communication range.

(Second Modification)

indifferently from the first modification, such a configuration may also be adopted in which, when the communication range of the wireless communication unit 11 is stepwise narrowed, the communication range is stepwise narrowed in another form such that the communication range is stepwise narrowed every time a given time period elapses.

(Third Modification)

Note that, in each of the first and second modifications, the case where the communication range is categorized into a plurality of levels and stepwise changed to lower-level narrower ranges has been described by way of example. However, such a configuration may also be adopted in which, even when the communication range is to be changed to a wider range, the communication range is similarly categorized into a plurality of levels and stepwise changed to higher-level wider ranges.

(Fourth Modification)

The changing of the communication range is not limited to the configuration which changes the communication range by changing the transmission output from the antenna 12. Instead, such a configuration may also be adopted which changes the communication range by switching the antenna to be used between a plurality of antennas using different communication ranges (hereinafter referred to as a fourth modification). The following will describe the fourth modification using the drawings. The short-range wireless communication system 100 of the fourth modification is the same as the short-range wireless communication system 100 of the first embodiment except that the short-range wireless communication system 100 of the fourth modification includes a short-range wireless communication device 1a instead of the short-range wireless communication device 1.

Figure 7:
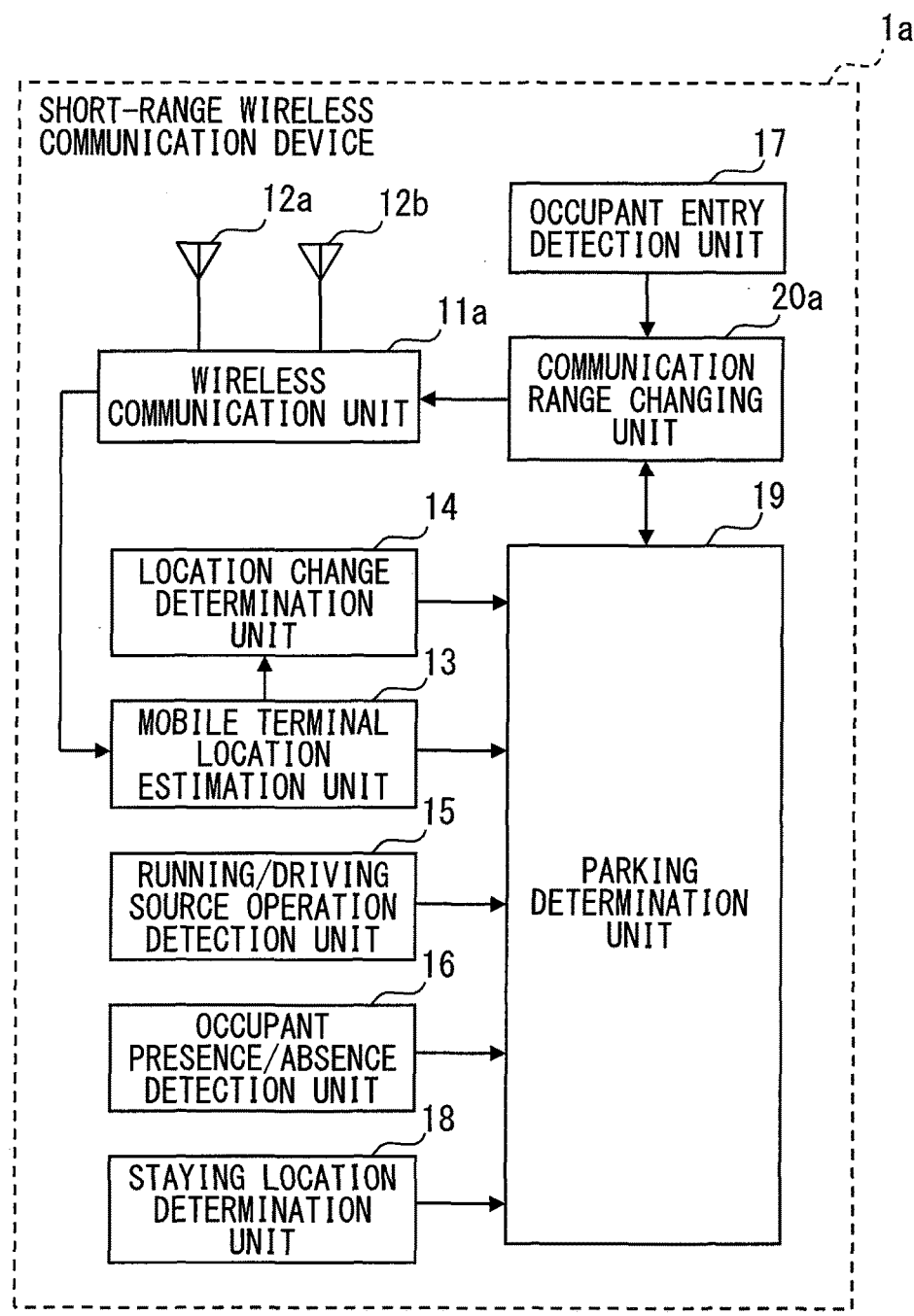
FIG. 7 is a functional block diagram showing an example of a schematic configuration of the short-range wireless communication device.

As shown in FIG. 7, the short-range wireless communication device 1a includes a wireless communication unit 11a, the mobile terminal location estimation unit 13, the location change determination unit 14, the running/driving source operation detection unit 15, the occupant presence/absence detection unit 16, the occupant entry detection unit 17, the staying location determination unit 18, the parking determination unit 19, and a communication range changing unit 20a. The short-range wireless communication device 1a is the same as the short-range wireless communication device 1 of the first embodiment except that the short-range wireless communication device 1a includes the wireless communication unit 11a and the communication range changing unit 20a instead of the wireless communication unit 11 and the communication range changing unit 20. The short-range wireless communication device 1a also corresponds to the on-vehicle device.

The wireless communication unit 11a is the same as the wireless communication unit 11 of the first embodiment except that the wireless communication unit 11a includes a plurality of antennas 12a and 12b. It is assumed that the antennas 12a and 12b use different communication ranges. The description will be continued hereinbelow on the assumption that the communication range of the antenna 12a is wider than the communication range of the antenna 12b.

The communication range changing unit 20a is the same as the communication range changing unit 20 of the first embodiment except that a method of changing the communication range is different from that used by the communication range changing unit 20 of the first embodiment. The communication range changing unit 20a changes the communication range by switching the antenna to be used between the antennas 12a and 12b. For example, when the communication range is to be widened, the antenna 12a is used and, when the communication range is to be narrowed, the antenna 12b is used.

Note that, by way of example, the configuration using the two antennas, i.e., the antennas 12a and 12b is shown herein. However, the configuration is not limited thereto. For example, such a configuration may also be adopted which categorizes the communication range into a plurality of levels more than two levels and stepwise changes the communication range from one of the levels to another using a plurality of antennas more than two antennas.

In the configuration of the fourth modification also, after the parking of the vehicle A is determined, the communication range of the wireless communication unit 11a is changed to the narrow communication range. This can reduce useless communication connection between the short-range wireless communication device 1a and the mobile terminal 2 and can reduce power waste in the short-range wireless communication device 1a and the mobile terminal 2. Also, in the configuration of the fourth modification, it is possible to change the communication range of the wireless communication unit 11a without changing transmission outputs from the antennas.

(Fifth Modification)

Alternatively, as the method of changing the communication range of the wireless communication unit 11a having the plurality of antennas 12a and 12b, such a method may also be adopted which changes the communication range by changing the number of the antennas in use.

(Sixth Modification)

Besides, as the method of changing the communication range of the wireless communication unit 11a having the plurality of antennas 112a and 12b, such a configuration may also be adopted which changes the communication range of the wireless communication unit 11a by changing the transmission outputs from the plurality of antennas 12a and 12b.

(Seventh Modification)

It may also be possible to adopt a configuration in which the short-range wireless communication device 1 or 1a does not include the staying location determination unit 18 and the result of determining whether or not the vehicle A is located at the predetermined place is not used to determine the parking of the vehicle. In this case, the flow chart for the determination of the parking shown in FIG. 4 may appropriately be configured such that, when the answer is YES in S21, the process moves to S23.

(Eighth Modification)

It may also be possible to adopt a configuration in which the short-range wireless communication device 1 or 1a does not include the location change determination unit 14 and the result of determining whether or not the location of the mobile terminal 2 relative to the vehicle A has changed over the given time period is not used to determine the parking of the vehicle. In this case, the flow chart for the determination of the parking shown in FIG. 4 may appropriately be configured such that, when the answer is YES in S23 or when the answer is NO in S24, the process moves to S27.

(Ninth Modification)

It may also be possible to adopt a configuration in which the result of determining whether or not the given time period has elapsed from the detection of the OFF state of the engine of the vehicle A by the running/driving source operation detection unit 15 is not used to determine the parking of the vehicle. In this case, the flow chart for the determination of the parking shown in FIG. 4 may be configured appropriately such that, when the answer is YES in S26, the process returns to S23 to be repeated or moves to S28.

(Tenth Modification)

The configuration has been shown in which, when the parking determination unit 19 determines that the vehicle A is parked and the wireless communication unit 11 or 11a and the mobile terminal 2 are not connected to be non-communicative, a shift to the intermittent mode occurs. However, the configuration is not limited thereto. For example, such a configuration may also be adopted which halts the transmission of a radio wave from the wireless communication unit 11 or 11a instead of causing a shift to the intermittent mode.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An on-vehicle device which is to be mounted on a vehicle, comprising:
    a wireless communication unit which is connected to a mobile terminal located within a communication range to perform wireless communication with the mobile terminal, wherein the on-vehicle device provides a service using the wireless communication of the wireless communication unit, the on-vehicle device further comprising:
    a parking determination unit which determines whether or not the vehicle is parked;
    a communication range changing unit which narrows, when the parking determination unit determines that the vehicle is parked, the communication range of the wireless communication unit such that the communication range is narrower than that before the parking determination unit determines that the vehicle is parked;
    a running/driving source operation detection unit which detects whether a running/driving source of the vehicle is ON or OFF;
    an occupant presence/absence detection unit which detects whether or not an occupant is present in an interior of the vehicle; and
    a mobile terminal location estimation unit which estimates a location of the mobile terminal relative to the vehicle,
    wherein the parking determination unit determines that the vehicle is parked when the running/driving source operation detection unit detects that the running/driving source is OFF, the occupant presence/absence detection unit detects that no occupant is present, and the location of the mobile terminal relative to the vehicle which is sequentially estimated by the mobile terminal location estimation unit is at a given distance or further away from the vehicle.

2. The on-vehicle device according to claim 1, wherein the communication range changing unit categorizes the communication range of the wireless communication unit into a plurality of levels not less than two levels and stepwise changes the communication range from one of the levels to another.

3. The on-vehicle device according to claim 1, further comprising:
    a location change determination unit which determines whether or not the location of the mobile terminal estimated by the mobile terminal location estimation unit has changed in a given time period,
    wherein the parking determination unit determines that the vehicle is parked when the location change determination unit determines that the location of the mobile terminal has not changed over the given time period.

4. The on-vehicle device according to claim 1, wherein the parking determining unit determines that the vehicle is parked when a given time elapses after the running/driving source operation detection unit detects that the running/driving source is OFF.

5. The on-vehicle device according to claim 1, further comprising:
    a staying location determination unit which determines whether or not the vehicle is located at a predetermined place,
    wherein the parking determination unit determines whether or not the vehicle is parked at the predetermined place using a result of the determination by the staying location determination unit.

6. The on-vehicle device according to claim 1, further comprising:
    an occupant entry detection unit which detects entry of an occupant into the vehicle,
    wherein, after the parking determination unit determines that the vehicle is parked, the communication range changing unit narrows the communication range of the wireless communication unit and widens, when the occupant entry detection unit detects the entry of the occupant into the vehicle, the communication range of the wireless communication unit such that the communication range is wider than before the detection of the entry of the occupant into the vehicle by the occupant entry detection unit.

7. The on-vehicle device according to claim 1, wherein the communication range changing unit changes the communication range of the wireless communication unit by changing a transmission output from the wireless communication unit.

8. The on-vehicle device according to claim 7, wherein the wireless communication unit has one antenna as an antenna to be used for transmission, and
wherein the communication range changing unit changes the communication range of the wireless communication unit by changing a transmission output from the one antenna.

9. The on-vehicle device according to claim 1, wherein the wireless communication unit has, as an antenna to be used for transmission, a plurality of antennas using communication ranges of different sizes, and
wherein the communication range changing unit switches the antenna to be used between the plurality of antennas to change the communication range of the wireless communication unit.

10. The on-vehicle device according to claim 1, wherein a service performed using the wireless communication in the wireless communication unit is at least one of a service which allows an equipment of the vehicle to be operated from the mobile terminal and a service which allows the mobile terminal to acquire information from the equipment of the vehicle.

11. An on-vehicle device which is to be mounted on a vehicle, comprising:
a wireless communication unit which is connected to a mobile terminal located within a communication range to perform wireless communication with the mobile terminal, wherein the on-vehicle device provides a service using the wireless communication of the wireless communication unit, the on-vehicle device further comprising:
a parking determination unit which determines whether or not the vehicle is parked;
a communication range changing unit which narrows, when the parking determination unit determines that the vehicle is parked, the communication range of the wireless communication unit such that the communication range is narrower than that before the parking determination unit determines that the vehicle is parked;
a mobile terminal location estimation unit which estimates a location of the mobile terminal relative to the vehicle;
a location change determination unit which determines whether or not the location of the mobile terminal estimated by the mobile terminal location estimation unit has changed in a given time period;
a running/driving source operation detection unit which detects whether a running/driving source of the vehicle is ON or OFF; and
an occupant presence/absence detection unit which detects whether or not an occupant is present in an interior of the vehicle,
wherein the parking determination unit determines that the vehicle is parked when the location change determination unit determines that the location of the mobile terminal has not changed over the given time period.

12. An on-vehicle device which is to be mounted on a vehicle, comprising:
a wireless communication unit which is connected to a mobile terminal located within a communication range to perform wireless communication with the mobile terminal, wherein the on-vehicle device provides a service using the wireless communication of the wireless communication unit, the on-vehicle device further comprising:
a parking determination unit which determines whether or not the vehicle is parked;
a communication range changing unit which narrows, when the parking determination unit determines that the vehicle is parked, the communication range of the wireless communication unit such that the communication range is narrower than that before the parking determination unit determines that the vehicle is parked;
a running/driving source operation detection unit which detects whether the running/driving source of the vehicle is ON or OFF;
an occupant presence/absence detection unit which detects whether or not an occupant is present in an interior of the vehicle; and
a mobile terminal location estimation unit which estimates a location of the mobile terminal relative to the vehicle,
wherein the parking determining unit determines that the vehicle is parked when a given time elapses after the running/driving source operation detection unit detects that the running/driving source is OFF.

13. An on-vehicle device which is to be mounted on a vehicle, comprising:
a wireless communication unit which is connected to a mobile terminal located within a communication range to perform wireless communication with the mobile terminal, wherein the on-vehicle device provides a service using the wireless communication of the wireless communication unit, the on-vehicle device further comprising:
a parking determination unit which determines whether or not the vehicle is parked;
a communication range changing unit which narrows, when the parking determination unit determines that the vehicle is parked, the communication range of the wireless communication unit such that the communication range is narrower than that before the parking determination unit determines that the vehicle is parked;
an occupant entry detection unit which detects entry of an occupant into the vehicle;
a running/driving source operation detection unit which detects whether a running/driving source of the vehicle is ON or OFF;
an occupant presence/absence detection unit which detects whether or not an occupant is present in an interior of the vehicle; and
a mobile terminal location estimation unit which estimates a location of the mobile terminal relative to the vehicle,
wherein, after the parking determination unit determines that the vehicle is parked, the communication range changing unit narrows the communication range of the wireless communication unit and widens, when the occupant entry detection unit detects the entry of the occupant into the vehicle, the communication range of the wireless communication unit such that the communication range is wider than before the detection of the entry of the occupant into the vehicle by the occupant entry detection unit.

* * * * *